(12) United States Patent
DeHart et al.

(10) Patent No.: US 11,156,144 B2
(45) Date of Patent: *Oct. 26, 2021

(54) REDUCTANT DELIVERY SYSTEMS AND METHODS

(71) Applicant: Cummins Emission Solutions Inc., Columbus, IN (US)

(72) Inventors: Taren DeHart, Columbus, IN (US); Vaibhav J. Lawand, Northville, MI (US); Stephen M. Holl, Columbus, IN (US); Paul Douglas Free, Hope, IN (US); Nassim Khaled, Khobar (SA); Colin L. Norris, Columbus, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,422

(22) Filed: Dec. 20, 2019

(65) Prior Publication Data

US 2020/0123952 A1 Apr. 23, 2020

Related U.S. Application Data

(63) Continuation of application No. 15/838,019, filed on Dec. 11, 2017, now Pat. No. 10,544,721.

(51) Int. Cl.
*F01N 3/20* (2006.01)
*B01D 53/94* (2006.01)
*B01D 53/90* (2006.01)

(52) U.S. Cl.
CPC ......... *F01N 3/208* (2013.01); *B01D 53/9418* (2013.01); *F01N 3/2066* (2013.01);
(Continued)

(58) Field of Classification Search
CPC combination set(s) only.
See application file for complete search history.

(56) References Cited

U.S. PATENT DOCUMENTS 8,336,736 B2 12/2012 Schroeder et al.
9,512,763 B2 12/2016 Hudgens et al.
(Continued)

FOREIGN PATENT DOCUMENTS

WO WO-2014/124183 A1 8/2014

OTHER PUBLICATIONS

International Search Report & Written Opinion for PCT/US2018/063803 dated Feb. 11, 2019, 13 pages.

*Primary Examiner* — Binh Q Tran
(74) *Attorney, Agent, or Firm* — Foley & Lardner LLP (57) ABSTRACT

A controller for a dosing module including a pump, an inlet manifold coupled to the pump, a nozzle, an outlet manifold coupled to the nozzle, a first branch coupled to the inlet manifold and the outlet manifold and having a first flow restrictor and a first valve, a second branch coupled to the inlet manifold and the outlet manifold and having a second flow restrictor and a second valve, and a sensor coupled to the inlet manifold and the outlet manifold, includes an input/output interface and a processing circuit. The input/output interface is configured to electronically communicate with the first valve and the second valve. The processing circuit configured to selectively cause the first valve to be in a first valve first position, in which the first valve facilitates fluid communication from the inlet manifold to the outlet manifold through the first branch, and a first valve second position.

20 Claims, 7 Drawing Sheets

(52) U.S. Cl.
CPC .......... *B01D 53/90* (2013.01); *B01D 53/9431* (2013.01); *B01D 53/9495* (2013.01); *F01N 2610/02* (2013.01); *F01N 2610/08* (2013.01); *F01N 2610/14* (2013.01); *F01N 2610/144* (2013.01); *F01N 2610/146* (2013.01); *F01N 2610/1406* (2013.01); *F01N 2610/148* (2013.01); *F01N 2610/1453* (2013.01); *F01N 2900/1808* (2013.01); *F01N 2900/1812* (2013.01)

(56) References Cited

U.S. PATENT DOCUMENTS

| | | | |
|---|---|---|---|
| 9,719,386 B2 | 8/2017 | Fan et al. | |
| 10,113,463 B2 | 10/2018 | Farmer et al. | |
| 10,202,883 B2 | 2/2019 | Yang et al. | |
| 10,544,721 B2 * | 1/2020 | DeHart | F01N 3/2066 |
| 10,577,994 B2 * | 3/2020 | Mittal | F01N 3/208 |
| 2003/0230075 A1 | 12/2003 | Saito et al. | |
| 2006/0169804 A1 | 8/2006 | Pontoppidan | |
| 2007/0022745 A1 * | 2/2007 | Narita | F02M 26/42 60/286 |
| 2007/0074504 A1 * | 4/2007 | Driscoll | F02M 61/1813 60/285 |
| 2012/0036835 A1 | 2/2012 | Huthwohl | |
| 2012/0210697 A1 | 8/2012 | Garimella et al. | |
| 2013/0037146 A1 | 2/2013 | Anagnos | |
| 2014/0166141 A1 | 6/2014 | Golin et al. | |
| 2015/0047326 A1 | 2/2015 | Gardner et al. | |
| 2015/0052878 A1 | 2/2015 | Qi | |
| 2016/0032805 A1 | 2/2016 | Huang et al. | |
| 2016/0298568 A1 | 10/2016 | Giroud et al. | |
| 2017/0087515 A1 | 3/2017 | Huang et al. | |
| 2017/0152781 A1 * | 6/2017 | Free | F02M 26/43 |
| 2017/0191393 A1 | 7/2017 | Koshy et al. | |
| 2017/0350290 A1 * | 12/2017 | Yang | F01N 9/00 |

* cited by examiner

REDUCTANT DELIVERY SYSTEMS AND METHODS

CROSS-REFERENCE TO RELATED APPLICATION

The present application is a Continuation of U.S. patent application Ser. No. 15/838,019, filed Dec. 11, 2017, the contents of which are incorporated herein by reference in their entireties.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds—such as diatomic nitrogen, water, or carbon dioxide—with the aid of a catalyst and a liquid reductant. The catalyst may be included in a catalyst chamber of an exhaust system, such as that of a vehicle or power generation unit. A liquid reductant—such as anhydrous ammonia, aqueous ammonia, diesel exhaust fluid (DEF), or aqueous urea—is typically introduced into the exhaust gas flow prior to the catalyst chamber.

To introduce the liquid reductant into the exhaust gas flow for the SCR process, an SCR system may dose or otherwise introduce the liquid reductant through a dosing module that vaporizes or sprays the liquid reductant into an exhaust pipe of the exhaust system up-stream of the catalyst chamber. An amount of the liquid reductant that is sprayed into the exhaust pipe is metered by controlling a valve or a pump which provides the liquid reductant to the valve.

In some applications, the valve is provided the liquid reductant from the pump at a fixed or variable pressure. In these applications, the amount of liquid reductant that is sprayed into the exhaust pipe can be varied by changing a position of the valve. In other applications, a fixed displacement pump is controlled, by varying a number of pump strokes, to directly meter the amount of liquid reductant that is sprayed into the exhaust pipe without the use of a valve. However, none of these approaches provides multiple flow paths, each having an individually controllable valve and an orifice that provides the reductant to a common outlet at a target flow rate such that a customized flow rate can be achieved by controlling the valves. Therefore, none of these approaches offers control of a turndown ratio (e.g., ratio of maximum flow rate to minimum flow rate, etc.) through the addition and subtraction of flow paths, orifices, or valves.

SUMMARY

In an embodiment, a dosing module includes an inlet manifold, an outlet manifold, a first branch, and a second branch. The inlet manifold is configured to selectively receive reductant from a pump. The outlet manifold is configured to selectively provide the reductant to a nozzle. The first branch is coupled to the inlet manifold and the outlet manifold. The first branch is configured to selectively provide the reductant from the inlet manifold to the outlet manifold. The first branch includes a first flow restrictor configured to restrict the reductant as the reductant is provided to the outlet manifold. The second branch is coupled to the inlet manifold and the outlet manifold. The second branch is configured to selectively provide the reductant from the inlet manifold to the outlet manifold separately from the first branch. The second branch includes a second flow restrictor that is configured to restrict the reductant as the reductant is provided to the outlet manifold.

In another embodiment, a reductant delivery system includes a tank, a nozzle, a first pump, an inlet manifold, an outlet manifold, and a first branch. The tank is configured to contain reductant. The nozzle is configured to selectively provide the reductant into an exhaust conduit. The first pump is configured to selectively draw the reductant from the tank. The inlet manifold is configured to selectively receive the reductant from the first pump. The outlet manifold is configured to selectively provide the reductant to the nozzle. The first branch is coupled to the inlet manifold and the outlet manifold. The first branch is configured to selectively provide the reductant from the inlet manifold to the outlet manifold. The first branch includes a first valve and a first flow restrictor. The first valve is operable between an open position in which the reductant is provided from the inlet manifold to the outlet manifold through the first branch, and a closed position in which the reductant is not provided from the inlet manifold to the outlet manifold through the first branch. The first flow restrictor is configured to restrict the reductant as the reductant is provided to the outlet manifold through the first branch.

In still another embodiment, a combined manifold includes an inlet manifold an outlet manifold, a first branch, and a second branch. The inlet manifold is configured to selectively receive reductant from a pump. The outlet manifold is configured to selectively provide the reductant to a nozzle. The first branch is coupled to the inlet manifold and the outlet manifold. The first branch is configured to selectively provide the reductant from the inlet manifold to the outlet manifold. The first branch includes a first flow restrictor configured to restrict the reductant as the reductant is provided to the outlet manifold. The second branch is coupled to the inlet manifold. The second branch is configured to receive the reductant from a tank and to selectively provide the reductant to the inlet manifold such that the reductant is provided to the pump via the inlet manifold. The inlet manifold, the outlet manifold, the first branch, and the second branch are structurally integrated.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for reductant delivery in an aftertreatment system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engines (e.g., diesel internal combustion engines, etc.) produce exhaust gases that are often treated within an aftertreatment system. This treatment often includes treating (e.g., dosing, etc.) the exhaust gasses with a reductant. Dosing of the exhaust gasses is typically performed by providing the exhaust gasses with pressurized reductant. This reductant is typically metered by a pulsing mechanism, which inherently provides inconsistent flow (e.g., through the use of a variable valve and a fixed displacement pump, etc.). To mitigate this inconsistent flow, aftertreatment systems may utilize accumulators or pressure regulators such that the aftertreatment system is tailored for a specific application. Additionally, this inconsistent flow can cause excessive deposition of the reductant (e.g., via crystallization, etc.) within nozzles or lances, causing the nozzles or lances to become undesirable.

Implementations described herein relate to a reductant delivery system that utilizes a dosing module having a plurality of branches, each of the branches including an independently controllable valve and a flow restrictor such that the valve controls flow of the reductant through the flow restrictor. By controlling each of the valves, a target (e.g., customized, etc.) flow rate of the reductant can be provided from the dosing module to an exhaust conduit. The reductant delivery system is capable of achieving a smooth, continuous flow without the use of accumulators or pressure regulators, and pressure within the dosing module does not fluctuate with changes in nozzle or injector behavior. In addition to controlling the valves, which provide relatively imprecise control over the flow rate of the reductant provided to the exhaust conduit, the reductant delivery system may control a speed of the pump or utilize a bypass mechanism to provide relatively precise control over the flow rate of the reductant provided to the exhaust conduit.

The reductant delivery system is capable of tailoring the dosing module to mitigate the effects of pressure drops originating from, for example, head height and line length. Additionally, the reductant delivery system is capable of being tailored for various aftertreatment systems by, for example, interchanging flow restrictors or pumps and/or by incorporating more or less branches. In this way, the reductant delivery system is advantageous from an aftertreatment system manufacturing standpoint because the reductant delivery system facilitates adaptation to many different configurations of the aftertreatment system with relatively simple changes to the reductant delivery system, as opposed to the use of different reductant delivery systems with different aftertreatment systems, which is cost intensive and inefficient.

The reductant delivery system utilizes a closed loop process that compares a target flow rate of the reductant provided to the exhaust conduit to a measured flow rate of the reductant provided to the exhaust conduit. In contrast to this closed loop process, many dosers utilize open loop processes. These open loop processes lack the ability to correct for over dosing or under dosing. These dosers address this deficiency by constantly providing excess reductant. However, this causes unnecessary reductant consumption, making these open-loop dosers undesirable.

II. Overview of Aftertreatment System

Figure 1:
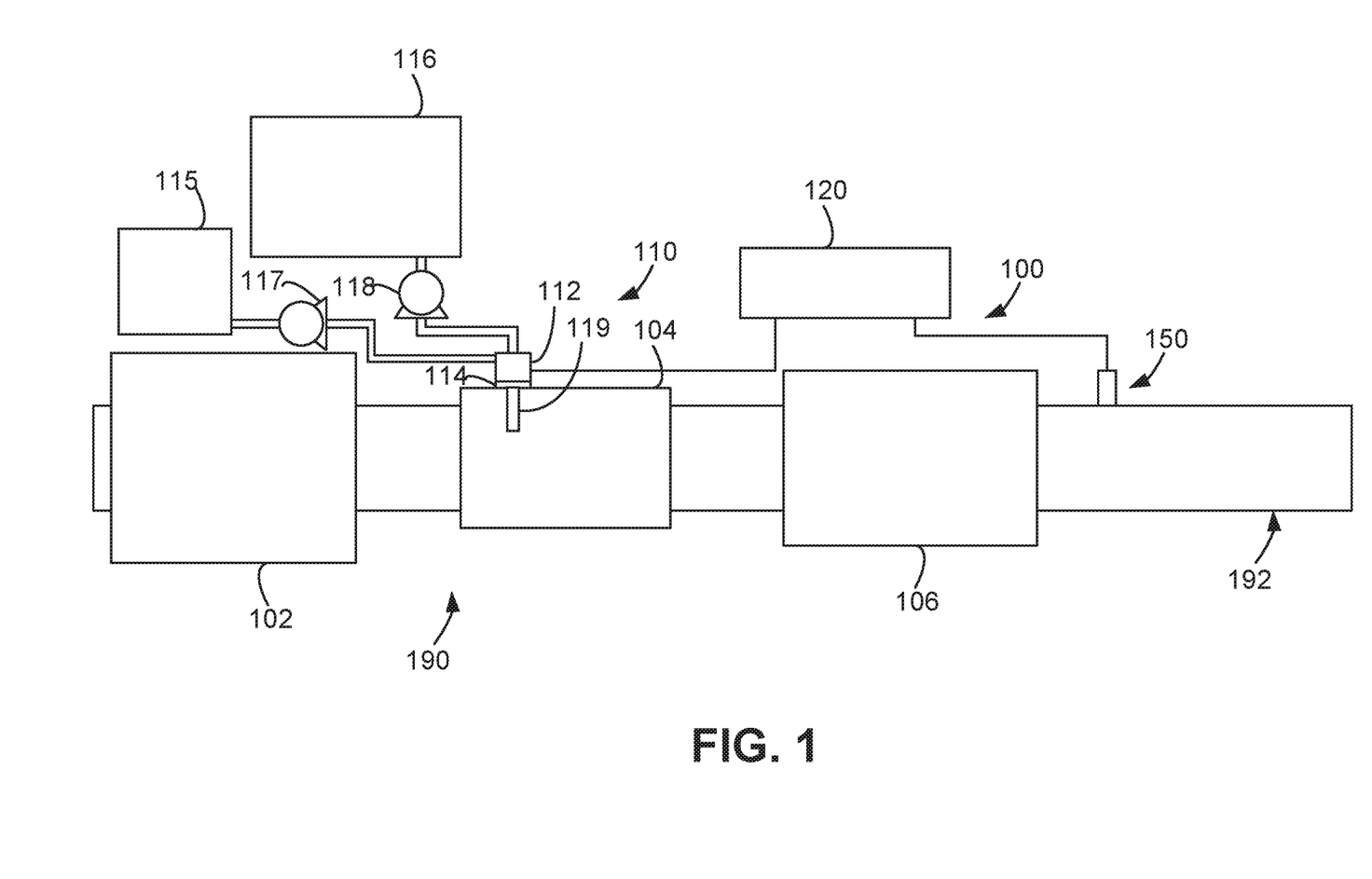
FIG. 1 is a block schematic diagram of an example aftertreatment system having an example reductant delivery system for an exhaust system.

FIG. 1 depicts an aftertreatment system 100 having an example reductant delivery system 110 for an exhaust system 190. The exhaust system 190 receives exhaust gasses from an internal combustion engine (e.g., thirty-eight liter displacement internal combustion engine, one-hundred and twenty liter displacement internal combustion engine, etc.). The aftertreatment system 100 includes a particulate filter (e.g., a diesel particulate filter (DPF) 102), the reductant delivery system 110, a decomposition chamber 104 (e.g., reactor, etc.), a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide. In some implementations, the DPF 102 may be omitted.

The decomposition chamber 104 is configured to convert a reductant, such as urea or DEF, into ammonia. The decomposition chamber 104 includes a reductant delivery system 110 having a dosing module 112 (e.g., doser, etc.) configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 on which the dosing module 112 is mounted. The dosing module 112 is fluidly coupled to one or more reductant sources 116. In some implementations, a pump 118 may be used to pressurize the reductant from the reductant sources 116 for delivery to the dosing module 112.

The dosing module 112 is also fluidly coupled to one or more air sources 115. For example, the air sources 115 may be an air intake or air storage device (e.g., tank, etc.). A pump 117 (e.g., lift pump, etc.) is used to pressurize the air from the air sources 115 for delivery to the dosing module 112 (e.g., via pressurized conduits, etc.). The dosing module 112 mixes the air from the air sources 115 and the reductant from the reductant sources 116 and provides the air-reductant mixture into the decomposition chamber 104 via a static dosing lance assembly 119. The static dosing lance assembly 119 may be configured to disperse the air-reductant mixture into the decomposition chamber 104 with a target trajectory or dispersion pattern. The static dosing lance assembly 119 may contain a single dosing lance or a plurality of dosing lances such that the dosing module 112 can be tailored for a target application.

The dosing module 112, the pump 117, and the pump 118 are also electrically or communicatively coupled to a controller 120. The controller 120 is configured to control the dosing module 112 to dose the air-reductant mixture into the decomposition chamber 104. The controller 120 may also be configured to control the pump 117 and/or the pump 118. For example, the controller 120 may control the pump 117 and the pump 118 to obtain a target mixture of air and reductant that is provided to the decomposition chamber 104 via the static dosing lance assembly 119.

The controller 120 may include a microprocessor, an application-specific integrated circuit (ASIC), a field-programmable gate array (FPGA), etc., or combinations thereof. The controller 120 may include memory, which may include but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), Erasable Programmable Read Only Memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes an inlet in fluid communication with the decomposition chamber 104 from which exhaust gas and reductant are received and an outlet in fluid communication with an end of the exhaust system 190.

The exhaust system 190 may further include an oxidation catalyst (for example a diesel oxidation catalyst (DOC)) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber 104. For instance, the DPF 102 and the SCR catalyst 106 may be combined into a single unit. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190; for example, a tip of the sensor 150 may extend into a portion of the exhaust system 190. In other implementations, the sensor 150 may receive exhaust gas through another conduit, such as one or more sample pipes extending from the exhaust system 190. While the sensor 150 is depicted as positioned downstream of the SCR catalyst 106, it should be understood that the sensor 150 may be positioned at any other position of the exhaust system 190—including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the foregoing positions of the exhaust system 190.

III. Example Reductant Delivery System

Figure 2:
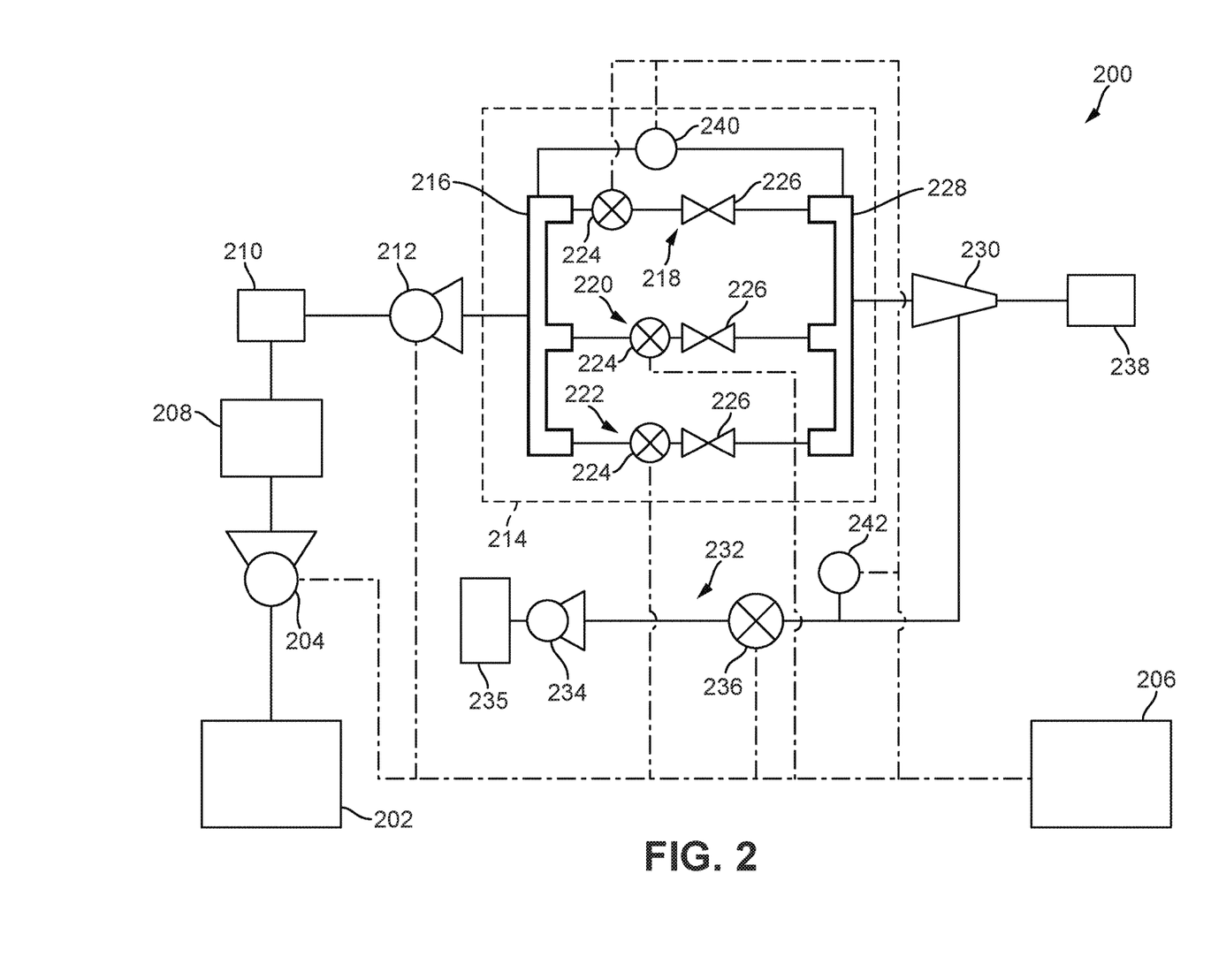
FIG. 2 is a block schematic diagram of an example reductant delivery system for an aftertreatment system, such as the aftertreatment system shown in FIG. 1.

FIG. 2 illustrates a reductant delivery system 200, such as the reductant delivery system 110 shown in FIG. 1, according to an example embodiment. As will be described in more detail herein, the reductant delivery system 200 performs reductant and air metering and provides a reductant-air to a nozzle or lance, such as the static dosing lance assembly 119. The reductant delivery system 200 includes electronic controls that separately control a number of valves, each independently metering the reductant such that a target amount (e.g., a target flow rate, a target pressure, etc.) of reductant can be provided by the reductant delivery system 200. The reductant delivery system 200 may be utilized in a continual dosing application where interrupted flow of the reductant provided to an exhaust conduit is not advantageous. In these applications, additional atomizing mechanisms (e.g., air atomizing mechanisms, thermal atomizing mechanisms, mechanical atomizing mechanisms, etc.) may be employed (e.g., within an exhaust conduit, etc.).

The reductant delivery system 200 includes a tank 202 (e.g., reserve tank, main tank, etc.) that stores the reductant and a pump 204 (e.g., reserve pump, main pump, etc.). The pump 204 is configured to draw the reductant from the tank 202 and to provide a target amount of reductant. The pump 204 is electronically communicable with, and controlled by, a controller 206, as represented by the dot-dash-dot lines in FIG. 2. The controller 206 may, for example, control a rotational speed of an impeller of the pump 204.

The reductant delivery system 200 also includes a day tank 208 (e.g., critical tank, etc.) that receives the reductant from the pump 204, a filter 210 (e.g., reductant filter, particulate filter, screen filter, mesh filter, etc.) that receives the reductant from the day tank 208 and filters the reductant, and a pump 212 (e.g., day pump, critical pump, etc.). The pump 212 is configured to draw the reductant from the day tank 208 through the filter 210 and provide a target amount of reductant from the pump 212. The pump 212 is electronically communicable with, and controlled by, the controller 206. The controller 206 may, for example, control a rotational speed of an impeller of the pump 212. The pump 212 is a variable speed or pressure-smooth flow pump. In an example embodiment, the reductant delivery system 200 does not include accumulators or pressure regulators, and is thus able to achieve continuous flow with line pressure that does not fluctuate due to injector behavior.

The day tank 208 and the pump 212 are configured to provide the reductant for the reductant delivery system 200 without the use of the pump 204 and the tank 202. For example, the day tank 208 may receive the reductant from the tank 202 such that the day tank 208 is filled with the reductant, and the reductant may be subsequently, or simultaneously, provided to the pump 212. The pump 212 may not be configured to draw the reductant from the day tank 208 until the day tank 208 contains a threshold amount (e.g., a minimum amount, etc.) of the reductant. The day tank 208 and the pump 212 may function to store an amount (e.g., seventy-five liters, five-hundred liters, one-thousand liters, two-thousand liters, etc.) of the reductant for use in the event that the reductant can no longer be provided from the tank 202 (e.g., if the pump 204 becomes inoperable, etc.). In this way, the day tank 208 and the pump 212 may be advantageous in mission-critical applications (e.g., emergency diesel generators, dual-fuel boilers, etc.).

The reductant delivery system 200 also includes a dosing module 214, such as the dosing module 112 shown in FIG. 1. The dosing module 214 includes an inlet manifold 216 that receives the reductant from the pump 212. The inlet manifold 216 is configured to distribute (e.g., equally, evenly, etc.) the reductant amongst a plurality of branches (e.g., flow paths, etc.). In FIG. 2, the dosing module 214 is shown as including a first branch 218, a second branch 220, and a third branch 222. The first branch 218, the second branch 220, and the third branch 222 each include a valve 224 (e.g., electronically controllable valve, solenoid valve, electronic ball valve, etc.) that receives the reductant from the inlet manifold 216 and a flow restrictor 226 (e.g., nozzle, etc.) that selectively receives the reductant from the valve 224 and provides the reductant to an outlet manifold 228. Each of the valves 224 is operable between (e.g., configured to rotate between, etc.) a first position (e.g., an open position, etc.) and a second position (e.g., a closed position, etc.) independent of the other valves 224. It is understood that the dosing module 214 may include two, four, six, or more branches similar to the first branch 218, the second branch 220, and the third branch 222. In this way, the reductant delivery system 200 may be flexible for relatively easy incorporation in a variety of aftertreatment systems by simply adding or removing branches and/or by changing the configuration of the valves 224 and/or the flow restrictors 226.

By being connected to each of the first branch 218, the second branch 220, and the third branch 222, the inlet manifold 216 and the outlet manifold 228 reduce plumbing complexity and cost associated with the reductant delivery system 200 and assist in providing optimized responsiveness of the dosing module 214. While not shown, the dosing module 214 may include a purge valve (e.g., blow-off valve, drain valve, etc.) that may prevent over-pressurization of the inlet manifold 216 and/or assist in draining of the dosing module 214 (such as for servicing of the dosing module 214).

The reductant delivery system 200 also includes a nozzle 230 that receives the reductant from the outlet manifold 228. The reductant delivery system 200 also includes an air delivery system 232 that includes an air pump 234 an air supply 235 (e.g., air intake, air tank, etc.) and a valve 236 that receives air from the air supply 235. In addition to receiving the reductant from the outlet manifold 228, the nozzle 230 also separately receives the air from the valve 236. The valve 236 is electronically communicable with the controller 206 such that the controller 206 can control the valve 236 to provide a target amount of the air to the nozzle 230. The nozzle 230 is configured to combine the reductant from the outlet manifold 228 and the air from the valve 236 into a reductant-air mixture and to provide the reductant-air mixture to an exhaust conduit 238, such as the decomposition chamber 104 shown in FIG. 1.

Each of the valves 224 is electronically communicable with the controller 206 and individually controllable by the controller 206. Each of the valves 224 individually controls (e.g., modulates, etc.) a flow of the reductant through one of the first branch 218, the second branch 220, and the third branch 222. By controlling the valves 224, the controller 206 is capable of controlling (e.g., modulating, regulating, etc.) how much of the reductant is provided to each of the flow restrictors 226. Each of the flow restrictors 226 has a configuration (e.g., physical structure, etc.) that provides a target amount of the reductant to the outlet manifold 228 based upon a diameter of an orifice (e.g., opening, aperture, etc.) defined within the flow restrictor 226. For example, the orifice with the flow restrictor 226 may have a diameter of 0.33 millimeters, 0.4 millimeters, 0.65 millimeters, and other similar diameters. Further, the flow restrictor 226 may include multiple orifices, each having the same or different diameters.

In an example application, each of the flow restrictors 226 may have an orifice with a different diameter and be configured to provide a different target amount of the reductant to the outlet manifold 228. For example, the flow restrictor 226 of the first branch 218 may be configured to provide the reductant to the outlet manifold 228 at a first flow rate; the flow restrictor 226 of the second branch 220 may be configured to provide the reductant to the outlet manifold 228 at a second flow rate, greater than the first flow rate; and the flow restrictor 226 of the third branch 222 may be configured to provide the reductant to the outlet manifold 228 at a third flow rate, greater than the second flow rate. This example is illustrated in Table 1, below.

TABLE 1

Example of Various Flow Restrictors 226.

| Branch Within the Dosing Module 214 | Relative Orifice Diameter Within The Corresponding Flow Restrictor 226 | Relative Flow Rate of the Reductant Configured to be Provided by the Corresponding Flow Restrictors 226 |
| --- | --- | --- |
| First Branch 218 | $D_1$ | $Q_1$ |
| Second Branch 220 | $D_2$; $D_2 > D_1$ | $Q_2 > Q_1$ |
| Third Branch 222 | $D_3$; $D_3 > D_2 > D_1$ | $Q_3 > Q_2 > Q_1$ |

By controlling the valves 224, and knowing the target amounts of the reductant provided by each of the flow restrictors 226, the controller 206 can achieve a target overall amount of the reductant provided to the outlet manifold 228 and, ultimately, to the nozzle 230. The controller 206 utilizes the valves 224 to achieve a "coarse" or relatively imprecise control over the target overall amount of the reductant provided to the nozzle 230. However, the controller 206 also utilizes the pump 212 to achieve a "fine" or relatively precise control over the target overall amount of the reductant provided to the nozzle 230. For example, a speed of the pump 212, related to an amount of the reductant provided by the pump 212, may be varied (e.g., from one-thousand rotations per minute (RPM) to five-thousand RPM, etc.) by the controller 206 to provide a target amount of the reductant to the first branch 218, the second branch 220, and the third branch 222, within which the valves 224 are controlled to achieve the target overall amount of the reductant provided to the nozzle 230 through knowledge by the controller 206 of the configurations of the flow restrictors 226. Control over the target overall amount of the reductant provided to the nozzle 230 may be changed smoothly such that the reductant provided to the nozzle 230 is not substantially interrupted.

The reductant delivery system 200 also includes at least one sensor 240 that is communicable with both the inlet manifold 216 and the outlet manifold 228. The at least one sensor 240 is configured to measure a difference in a parameter (e.g., pressure, temperature, flow rate, quality, etc.) between the inlet manifold 216 and the outlet manifold 228. The at least one sensor 240 is electronically communicable with the controller 206 and configured to provide a sensed parameter, related to the difference in the parameter, to the controller 206. In an example embodiment, the at least one sensor 240 measures a difference between a first pressure within the inlet manifold 216 and a second pressure within the outlet manifold 228 and provides the difference to the controller 206. The controller 206 may, for example, utilize this difference to determine a flow of the reductant provided from the nozzle 230. To make this determination, the controller 206 may utilize knowledge of the specific gravity and temperature of the reductant (e.g., as determined by a sensor coupled to the controller 206, as programmed into the controller 206, etc.) and knowledge of an orifice diameter of each of the flow restrictors 226 (e.g., as programmed into the controller 206, etc.).

In some applications, the at least one sensor 240 includes a first sensor that measures a parameter within the inlet manifold 216 and a second sensor that measures a parameter within the outlet manifold 228, and the two sensors provide the sensed parameters to the controller 206 which itself computes the difference therebetween. In one application, the at least one sensor 240 includes a first sensor configured to measure one parameter (e.g., pressure, etc.) within the inlet manifold 216 and a second sensor configures to measure a different parameter (e.g., temperature, etc.) within the outlet manifold 228. The difference may be a pressure differential between the inlet manifold 216 and the outlet manifold 228. By controlling the pressure differential through the use of the valves 224, the reductant delivery system 200 can account for head height and line length insensitivity.

The reductant delivery system 200 also includes a sensor 242 that is communicable with a conduit between the valve 236 and the nozzle 230. The sensor 242 is configured to measure a parameter (e.g., pressure, temperature, flow rate, quality, etc.) between the valve 236 and the nozzle 230. The sensor 242 is electronically communicable with the controller 206 and configured to provide a sensed parameter, related to the parameter, to the controller 206. In an example embodiment, the sensor 242 measures a pressure of the air between the valve 236 and the nozzle 230 and provides the pressure to the controller 206.

Figure 3:
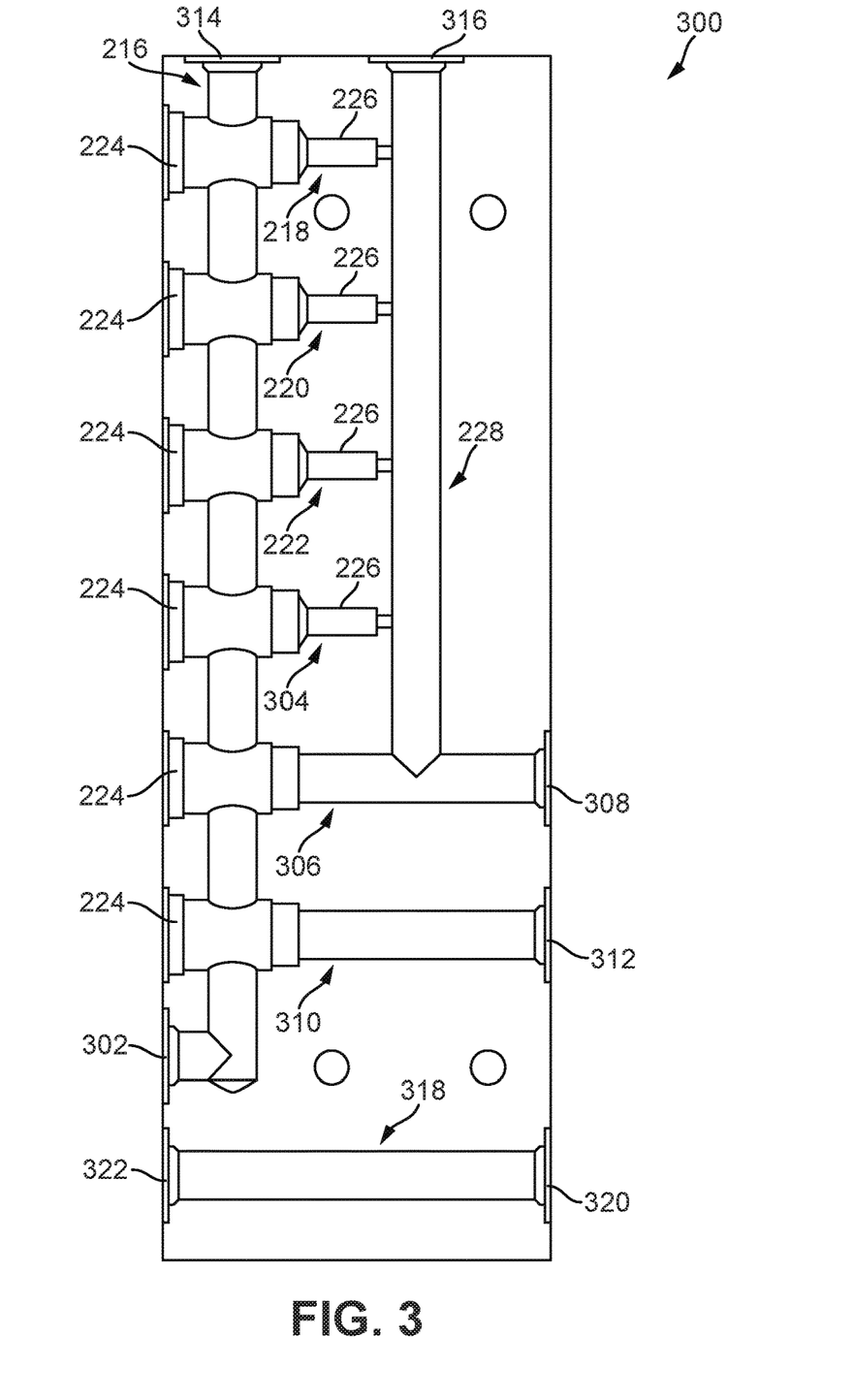
FIG. 3 is a cross-sectional view of an example manifold for a dosing module for a reductant delivery system for an aftertreatment system, such as the reductant delivery system shown in FIG. 2.
Figure 4:
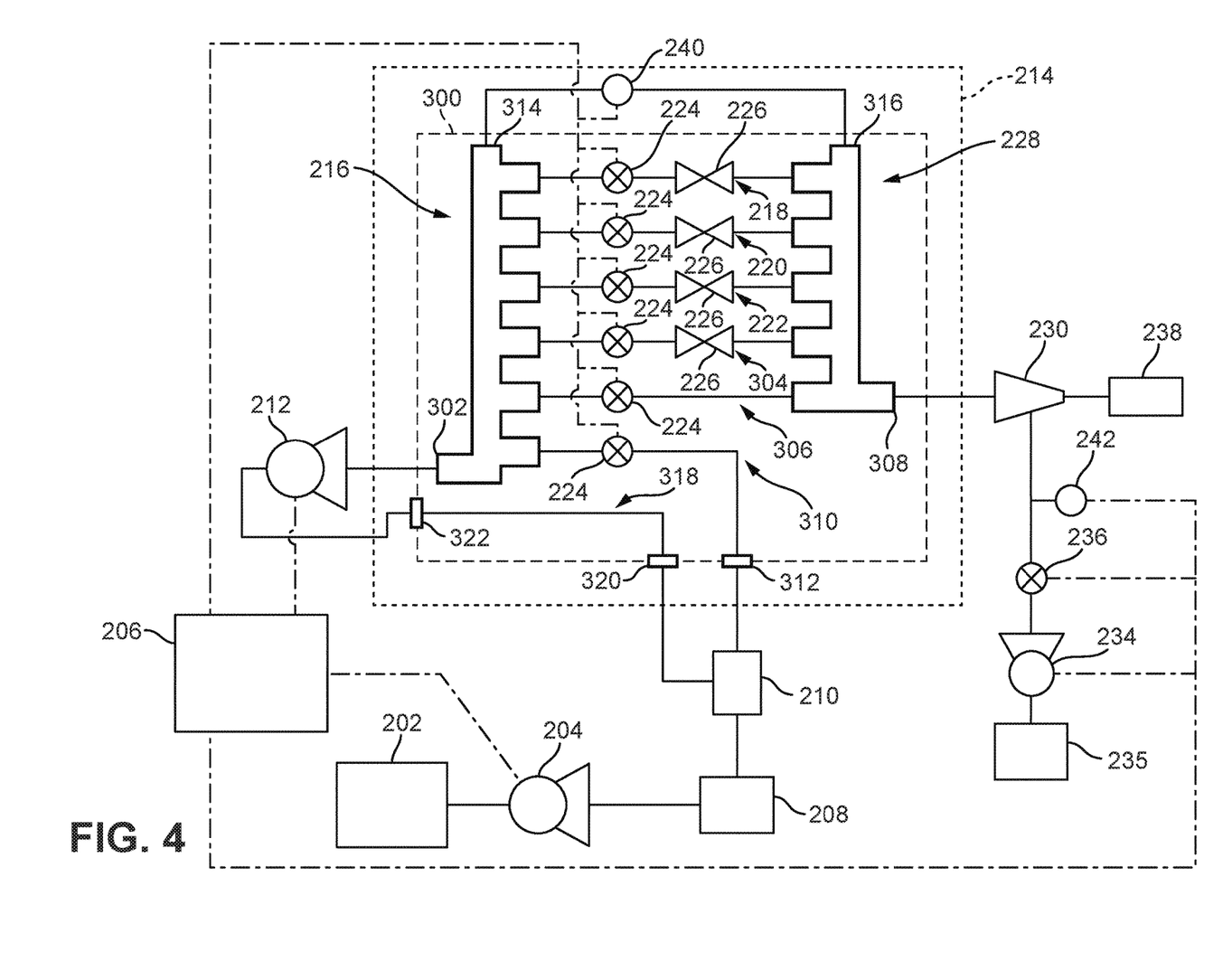
FIG. 4 is a block schematic diagram of an example reductant delivery system for an aftertreatment system, such as the aftertreatment system shown in FIG. 1, utilizing the manifold shown in FIG. 3.

FIG. 3 illustrates a combined manifold 300 for a reductant delivery system, such as the reductant delivery system 200 shown in FIG. 2 and another reductant delivery system 400 shown in FIG. 4. The combined manifold 300 includes the inlet manifold 216, which receives the reductant through an inlet 302, which receives the reductant from the pump 212. The combined manifold 300 also includes the valves 224 in fluid communication with the inlet manifold 216. The combined manifold 300 includes the first branch 218, the second branch 220, the third branch 222, and a fourth branch 304. As described with regard to FIG. 2, the first branch 218, the second branch 220, the third branch 222, and the fourth branch 304 each include one flow restrictor 226. The combined manifold 300 also includes the outlet manifold 228, which selectively receives the reductant from each of the first branch 218, the second branch 220, the third branch 222, and the fourth branch 304.

As shown in FIG. 3, the combined manifold 300 also includes a purge branch 306 that is coupled to the outlet manifold 228 and a valve 224 coupled to the inlet manifold 216. The purge branch 306 does not include the flow restrictor 226. The combined manifold 300 also includes an outlet 308 that provides the reductant from the outlet manifold 228, including from the purge branch 306, to the nozzle 230, as shown in FIG. 4. The valve 224 of the purge branch 306 is configured to selectively purge the reductant from the inlet manifold 216 by providing the reductant through the valve 224 to the purge branch 306 and into the outlet manifold 228.

The combined manifold 300 further includes a priming branch 310 that is coupled to a priming inlet 312 and includes a valve 224 coupled to the inlet manifold 216. The priming branch 310 does not include the flow restrictor 226. The priming inlet 312 receives the reductant directly from the day tank 208 through the filter 210. The valve 224 of the priming branch 310 is configured to be controlled to selectively provide the reductant to the pump 212 through the inlet manifold 216. In this way, the valve 224 of the priming branch 310 can provide the reductant to the pump 212 to prime the pump 212 (e.g., to fill the pump 212 with the reductant prior to the pump 212 providing the reductant to the inlet manifold 216 via the inlet 302, etc.).

The combined manifold 300 also includes a first sensor port 314 coupled to the inlet manifold 216 and a second sensor port 316 coupled to the outlet manifold 228. The first sensor port 314 and the second sensor port 316 are configured to be coupled to at least one the sensor 240. As previously mentioned, the at least sensor 240 may be distributed into a first sensor coupled to the inlet manifold 216 and a second sensor coupled to the outlet manifold 228. In these applications, the first sensor port 314 may be coupled to the first sensor, and the second sensor port 316 may be coupled to the second sensor.

In some implementations, the combined manifold 300 further includes a reductant passage 318 having an inlet 320 and an outlet 322. The inlet 320 receives the reductant from the day tank 208 through the filter 210. The outlet 322 provides the reductant from the reductant passage 318 to the pump 212. The reductant passage 318 is separate from the priming branch 310. The reductant passage 318 does not include a valve 224 and thus provides the reductant to the pump 212 constantly such that the reductant is available to the pump 212 for providing to the inlet manifold 216 at any time. The priming branch 310 supplements the reductant passage 318 by providing extra reductant to the pump 212 for priming the pump 212.

As shown in FIG. 3, the inlet manifold 216, the outlet manifold 228, the first branch 218, the second branch 220, the third branch 222, the fourth branch 304, the purge branch 306, the priming branch 310, and the reductant passage 318 are structurally integrated within the combined manifold 300. To achieve this integrated construction, the combined manifold 300 may be, for example, machined from a billet or may be cast from a mold.

FIG. 4 also illustrates that the valves 224 of the fourth branch 304, the purge branch 306, and the priming branch 310 are communicable with, and controllable by, the controller 206 as described with respect to the valves 224 of the first branch 218, the second branch 220, and the third branch 222.

Figure 5:
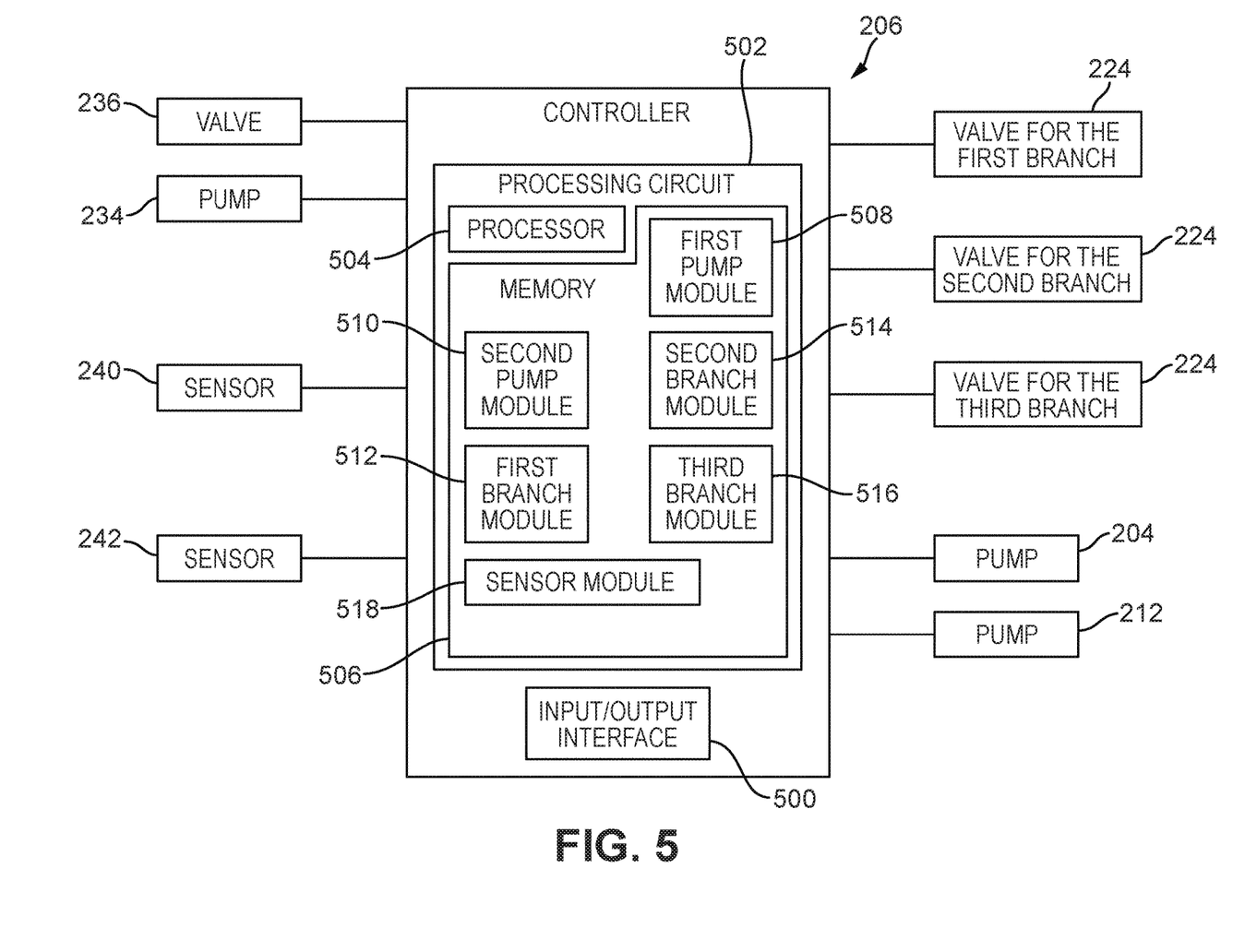
FIG. 5 is a block diagram of an example controller for a reductant delivery system for an aftertreatment system, such as the reductant delivery system shown in FIG. 2.

FIG. 5 illustrates the controller 206 according to an example embodiment. The controller 206 includes an input/output (I/O) interface 500 and a processing circuit 502. The I/O interface 500 facilitates interaction between the processing circuit 502 and the pump 204, the pump 212, the valves 224, the air pump 234, the valve 236, the at least one sensor 240, and the sensor 242. The processing circuit 502 includes a processor 504 and a memory 506. The memory 506 may include, but is not limited to, electronic, optical, magnetic, or any other storage or transmission device capable of providing the processor 504 with program instructions. The memory 506 may include a memory chip, EEPROM, EPROM, flash memory, or any other suitable memory from which the modules can read instructions. The instructions may include code from any suitable programming language.

The memory 506 includes a number of modules (e.g., microprocessors, ASIC, FPGAs, etc.). As shown in FIG. 5, the memory 506 includes a first pump module 508, a second pump module 510, a first branch module 512, a second branch module 514, a third branch module 516, and a sensor module 518. The first pump module 508 is configured to control interactions between the controller 206 and the pump 204. The second pump module 510 is configured to control interactions between the controller 206 and the pump 212. The first branch module 512 is configured to control interactions between the controller 206 and the valve 224 of the first branch 218. The second branch module 514 is configured to control interactions between the controller 206 and the valve 224 of the second branch 220. The third branch module 516 is configured to control interactions between the controller 206 and the valve 224 of the third branch 222.

While not shown, the reductant delivery system 200 may also incorporate a filter between the tank 202 and the pump 204. While not shown, the reductant delivery system 200 may incorporate a bypass line connected from between the day tank 208 and the pump 212 to between the day tank 208 and the filter 210. Use of this bypass line may be controlled by a valve, controllable by the controller 206, to cause the reductant to bypass the day tank 208. Such a bypass line may be advantageous in high-demand applications or when the day tank 208 is empty.

IV. Example Control System for the Example Reductant Delivery System

Figure 6:
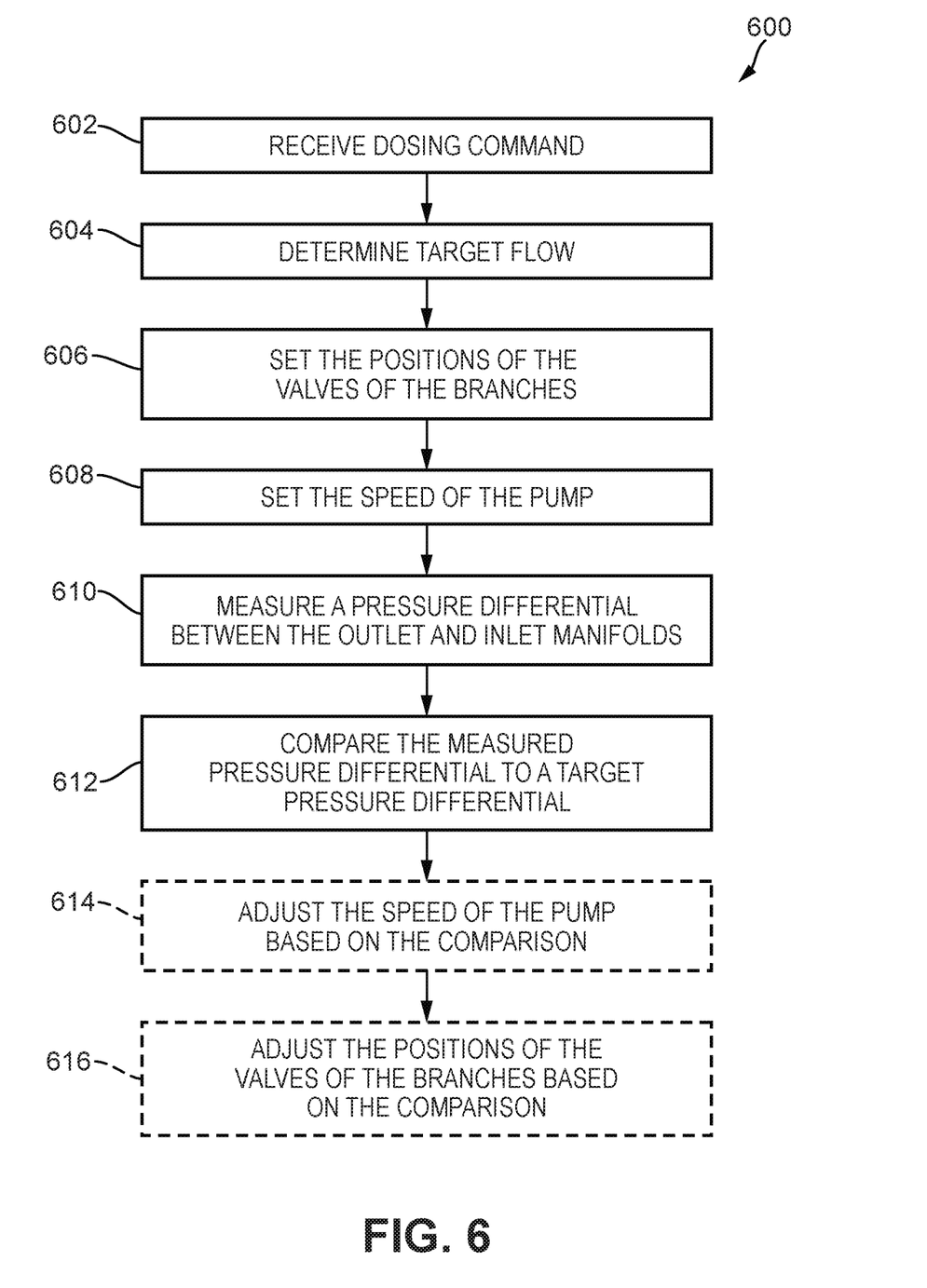
FIG. 6 is a flow chart for an example process of executing a dosing command by a reductant delivery system for an aftertreatment system, such as the reductant delivery system shown in FIG. 2.

FIG. 6 illustrates a process 600 for executing a dosing command by a reductant delivery system, such as the reductant delivery system 200. The process 600 meters the reductant provided to the exhaust conduit 238. The process 600 is a closed loop process that compares a target parameter (e.g., flow rate, etc.) of the reductant provided to the exhaust conduit to a measured parameter of the reductant provided to the exhaust conduit 238. In contrast to this closed loop process, many dosers utilize open loop processes that lack the ability to correct for over dosing or under dosing. These open loop dosers address this deficiency by constantly providing excess reductant which causes unnecessary reductant consumption and makes these open-loop dosers undesirable.

The process 600 includes, in block 602, receiving, by the controller 206 (e.g., by the processor 504, etc.), a dosing command. For example, a dosing command may be received by the controller 206 from the controller 120 of the aftertreatment system 100. The dosing command may include, for example, a dosing amount (e.g., a target volume of the reductant, a target flow rate of the reductant, a target pressure of the reductant, etc.) to be provided to the exhaust conduit 238. The process 600 further includes, in block 604, determining, by the controller 206 (e.g., by the processor 504, etc.), a target flow rate of the reductant to be provided to the exhaust conduit 238. For example, if the dosing command includes a target volume of the reductant, the controller 206 may correlate the target volume of the reductant to a target flow rate of the reductant to be provided to the exhaust conduit 238.

The process 600 also includes, in block 606, setting, by the controller 206 (e.g., first branch module 512, by the second branch module 514, by the third branch module 516, etc.), the positions of the valves 224 of the first branch 218, the second branch 220, and the third branch 222. The positions of the valves 224 are set based on the target flow of the reductant determined by the controller 206.

The target flow rate of the reductant, $Q_{Target}$; the maximum flow rate of the reductant, $Q_1$, possible through the flow restrictor 226 of the first branch 218; the maximum flow rate of the reductant, $Q_2$, possible through the flow restrictor 226 of the second branch 220; and the maximum flow rate of the reductant, $Q_3$, possible through the flow restrictor 226 of the third branch 222, are known by the controller 206. For example, $Q_{Target}$ may be received from an external system (e.g., from an engine control unit, etc.) and $Q_1$, $Q_2$, and $Q_3$ may be programmed into the controller 206. By controlling which of the valves 224 are open, and therefore which of the flow restrictors 226 receive flow and provide the flow to the outlet manifold 228, the controller 206 controls a turndown ratio of the dosing module 214. In an example embodiment, the dosing module 214 is capable of achieving a turndown ratio of six to one.

In an example application, the valves 224 are either fully open, such that the reductant is provided from the corresponding flow restrictor 226 at a maximum flow rate, or fully closed, such that none of the reductant is provided from the corresponding flow restrictor 226. In this application, only one of the valves 224 is open at a time. The open valve 224 is selected based on the comparison between the maximum flow rates of the reductant through the flow restrictors 226 and the target flow rate of the reductant.

Equations 1-5 illustrate an example application of the controller 206 where $$Q_{Target} = 5\frac{\text{ml}}{\text{s}} \quad (1)$$

$$Q_1 = 10\frac{\text{ml}}{\text{s}} \quad (2)$$

$$Q_2 = 20\frac{\text{ml}}{\text{s}} \quad (3)$$

$$Q_3 = 50\frac{\text{ml}}{\text{s}} \quad (4)$$

$$Q_{Target} \leq Q_1 \leq Q_2 \leq Q_3 \quad (5)$$

the valve 224 of the first branch 218 is opened, or remains open, and the valves 224 of the second branch 220 and the third branch 222 are closed, or remain closed.

Equations 6-10 illustrate an example application of the controller 206 where $$Q_{Target} = 15\frac{\text{ml}}{\text{s}} \quad (6)$$

$$Q_1 = 10\frac{ml}{s} \tag{7}$$

$$Q_2 = 20\frac{ml}{s} \tag{8}$$

$$Q_3 = 50\frac{ml}{s} \tag{9}$$

$$Q_1 \le Q_{Target} \le Q_2 \le Q_3 \tag{10}$$

the valve 224 of the second branch 220 is opened, or remains open, and the valves 224 of the first branch 218 and the third branch 222 are closed, or remain closed. In other applications where $Q_{Target}$ is equal to $Q_1$, the valve 224 of the first branch 218 is opened, or remains open, and the valves 224 of the second branch 220 and the third branch 222 are closed, or remain closed.

Equations 11-15 illustrate an example application of the controller 206 where $$Q_{Target} = 25\frac{ml}{s} \tag{11}$$

$$Q_1 = 10\frac{ml}{s} \tag{12}$$

$$Q_2 = 20\frac{ml}{s} \tag{13}$$

$$Q_3 = 50\frac{ml}{s} \tag{14}$$

$$Q_1 \le Q_2 \le Q_{Target} \le Q_3 \tag{15}$$

the valve 224 of the third branch 222 is opened, or remains open, and the valves 224 of the first branch 218 and the second branch 220 are closed, or remain closed. In other applications where $Q_{Target}$ is equal to $Q_2$, the valve 224 of the second branch 220 is opened, or remains open, and the valves 224 of the first branch 218 and the third branch 222 are closed, or remain closed.

In other applications, more than one of the valves 224 can be open at the same time, such that the valves 224 that are open cooperate to provide $Q_{Target}$. Equations 16-20 illustrate an example computation performed by the controller 206 in block 606

$$Q_{Target} = 30\frac{ml}{s} \tag{16}$$

$$Q_1 = 10\frac{ml}{s} \tag{17}$$

$$Q_2 = 20\frac{ml}{s} \tag{18}$$

$$Q_3 = 50\frac{ml}{s} \tag{19}$$

$$Q_{Target} = aQ_1 + bQ_2 + cQ_3 \tag{20}$$

$$30\frac{ml}{s} = a*10\frac{ml}{s} + b*20\frac{ml}{s} + c*50\frac{ml}{s}$$

$$30\frac{ml}{s} = a*10\frac{ml}{s} + b*20\frac{ml}{s} + c*50\frac{ml}{s}$$

$$\begin{bmatrix} a \\ b \\ c \end{bmatrix} = \begin{bmatrix} 0.5 \\ 0.5 \\ 0.3 \end{bmatrix} \tag{21}$$

to determine a relative position (e.g., where a value of one is fully open and a value of zero is fully closed, etc.), a, of the valve 224 of the first branch 218; a relative position, b, of the valve 224 of the second branch 220; and a relative position, c, of the valve 224 of the third branch 222, based on the target flow rate of the reductant, $Q_{Target}$; the maximum flow rate of the reductant, $Q_1$, possible through the flow restrictor 226 of the first branch 218; the maximum flow rate of the reductant, $Q_2$, possible through the flow restrictor 226 of the second branch 220; and the maximum flow rate of the reductant, $Q_3$, possible through the flow restrictor 226 of the third branch 222. Equation 21 illustrates an example set of values for a, b, and c. Other similar computations may be performed by the controller 206 in block 606 such that other values of a, b, and c may be obtained.

In some applications, the positions of the valves 224 are selected based on characteristics (e.g., maximum flow rates, degree of control, produced swirl, produced turbulence, etc.) of the flow restrictors 226. For example, the maximum flow rates of the flow restrictors 226 may be programmed (e.g., hard-coded, pre-coded, etc.) into the controller 206 (e.g., within the first branch module 512, within the second branch module 514, within the third branch module 516, etc.). In some applications, the positions of the valves 224 are determined based on a minimum degree of control of the valves 224. For example, the valve 224 of the first branch 218 may have a minimum degree of control equal to 0.1 such that any position with a higher degree of precision (e.g., 0.01, 0.001, etc.) cannot be attained exactly. In an example where valves 224 have different minimum degrees of control (e.g., the minimum degree of control of the valve 224 of the first branch 218 is 0.1 and the minimum degree of control of the valve 224 of the second branch 220 is 0.01, etc.), the controller 206 may select the position of the valve 224 of the first branch 218 and the valve 224 of the second branch 220 such that the target flow rate of the reductant determined in block 604 is achieved as precisely as possible when accounting for the minimum degrees of control of the valves 224. By setting the positions of the valves 224, the controller 206 achieves a "coarse" or relatively imprecise control over the target flow of the reductant. By setting the positions of the valves 224 at this point, the controller 206 utilizes feed-forward control.

The process 600 also includes, in block 608, setting, by the controller 206 (e.g., by the second pump module 510, etc.), the speed (e.g., RPM, etc.) of the pump 212. By setting the speed of the pump 212, the controller 206 achieves a "fine" or relatively precise control over the target flow of the reductant. For example, the controller 206 may set the speed of the pump 212 to two-thousand RPM. Additionally, the controller 206 may set the speed of the pump 212 according to a speed curve or function. In this way, the speed of the pump 212 may gradually ramp up to a maximum speed and/or the speed of the pump 212 may be modulated. By setting the speed of the pump 212 at this point, the controller 206 utilizes feed-forward control. Rather than varying a speed of the pump 212 to provide the relatively precise control over the target flow of the reductant, other mechanisms could additionally or alternatively be used. For example, a valve associated with a bypass flow path could be opened, thereby allowing a portion of the reductant provided by the pump 212 to bypass any of the valves 224 and flow restrictors 226 and be provided directly into the outlet manifold 228.

The process 600 also includes, in block 610, measuring, by the controller 206 (e.g., by the sensor module 518, etc.), a pressure differential between a pressure measured within the outlet manifold 228 and a pressure measured within the inlet manifold 216 (e.g., as measured by the at least one sensor 240, etc.). For example, the measured pressure differential may be between six and three bar. In block 612, the process 600 includes comparing, by the controller 206 (e.g., by the sensor module 518, etc.), the measured pressure differential to a target pressure differential. In an example embodiment, the target pressure differential is programmed into the controller 206 and selected based on the target flow. For example, the controller 206 may determine that for a target flow of twenty-five milliliters per second, the target pressure differential is 5.3 bar. Following this example, the controller 206 may compare the target pressure differential of 5.3 bar with a measured pressure differential of 4.8 bar and determine that the measured pressure differential is 0.5 bar less than the target pressure differential. In another example, the controller 206 may determine that the measured pressure differential is equal to approximately one-hundred and eight percent of the target pressure differential. Additionally, the controller 206 may determine a flow rate of the reductant provided to the exhaust conduit 238 through knowledge of the measured pressure differential.

The process 600 may also include, in block 614, adjusting, by the controller 206 (e.g., by the second pump module 510, etc.), the speed of the pump 212 based on the comparison between the measured pressure differential and the target pressure differential. For example, if the measured pressure differential is greater than the target pressure differential, the controller 206 may decrease a speed of the pump 212. In another example, the controller 206 may increase a speed of the pump 212 if the measured pressure differential is less than the target pressure differential. If the controller 206 determines that the measured pressure differential is equal to the target pressure differential, or within a threshold (e.g., five percent of the target pressure differential, three percent of the target pressure differential, etc.) of the target pressure differential, the speed of the pump 212 may not be changed by the controller 206. By adjusting the speed of the pump 212 at this point, the controller 206 utilizes feed-backward control.

The process 600 may also include, in block 616, adjusting, by the controller 206 (e.g., by the first branch module 512, by the second branch module 514, by the third branch module 516, etc.), the positions of the valves 224 of the first branch 218, the second branch 220, and the third branch 222 based on the comparison between the measured pressure differential and the target pressure differential. For example, if the measured pressure differential is greater than the target pressure differential, the controller 206 may close, or partially close, any of the valves 224. In another example, the controller 206 may open, or partially open, any of the valves 224 if the measured pressure differential is less than the target pressure differential. If the controller 206 determines that the measured pressure differential is equal to the target pressure differential, or within a threshold of the target pressure differential, the positions of the valves 224 may not be changed by the controller 206. By adjusting the positions of the valves 224 at this point, the controller 206 utilizes feed-backward control.

The process 600 can be implemented such that, for example, five percent accuracy (e.g., plus or minus accuracy, etc.) is attained with respect to the measured pressure differential and the target pressure differential, where the target pressure differential is greater than one bar. At this accuracy, the process 600 may be configured such, for example, that the reductant is provided through the nozzle 230 to the exhaust conduit 238 at a flow rate of between one milliliter per second and twelve milliliters per second with five percent accuracy. When the process 600 is implemented with multiple of the flow restrictors 226 providing the reductant into the outlet manifold 228, the accuracy of the process 600 is not noticeably impacted.

Figure 7:
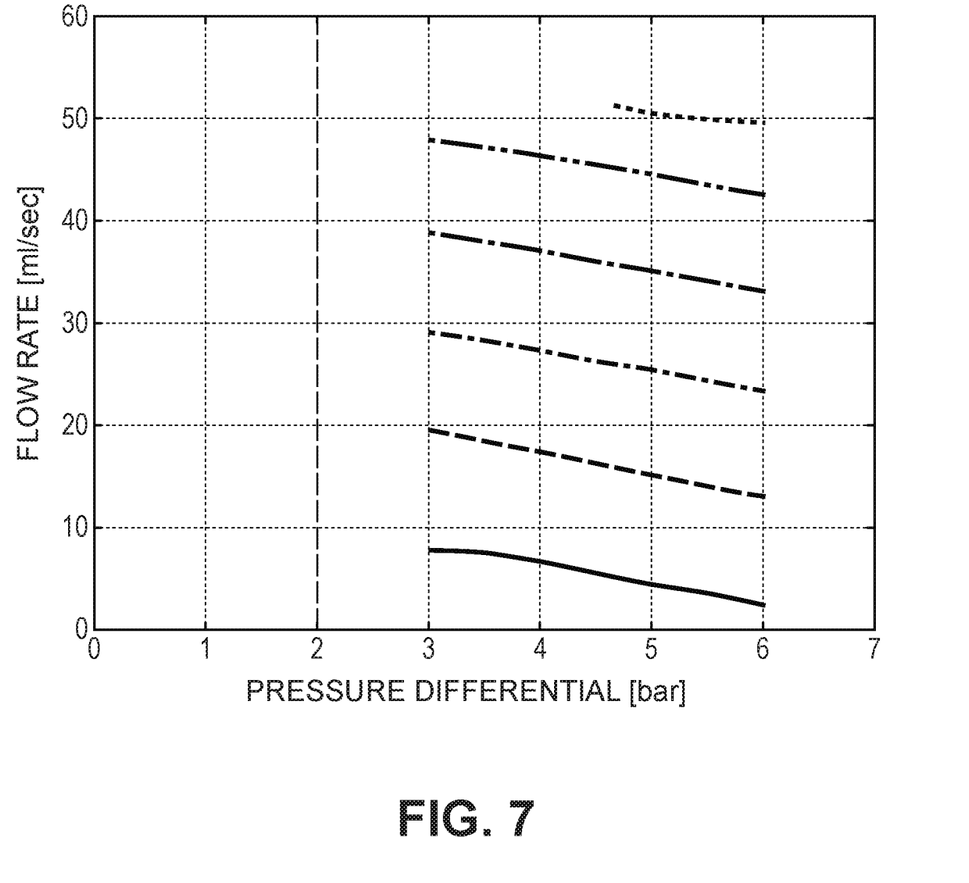
FIG. 7 is a plot showing various curves of flow verses pressure differential for various configurations of a pump.

FIG. 7 illustrates numerous curves of flow verses pressure differential for the pump 212. Each of the curves may be attained using different configurations (e.g., different sizes, different ratings, etc.) of the pump 212. The controller 206 is programmed with the curve corresponding to the configuration of the pump 212. In this way, the controller 206 may determine one of the flow and the pressure differential by knowing the other of the flow and the pressure differential. In the process 600, when the target flow is determined in block 604, the controller 206 may determine the target pressure differential through the use of the corresponding V. Construction of Example Embodiments While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two components directly or indirectly to one another. Such joining may be stationary (e.g., permanent) or movable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled," "in fluid communication," and the like, as used herein, mean the two components or objects have a pathway formed between the two components or objects in which a fluid (e.g., exhaust, water, air, gaseous reductant, gaseous ammonia, etc.) may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item, unless specifically stated to the contrary.

What is claimed is:

1. A controller for a dosing module comprising a pump, an inlet manifold coupled to the pump, a nozzle, an outlet manifold coupled to the nozzle, a first branch coupled to the inlet manifold and the outlet manifold and having a first flow restrictor and a first valve, a second branch coupled to the inlet manifold and the outlet manifold and having a second flow restrictor and a second valve, and a sensor coupled to the inlet manifold and the outlet manifold, the controller comprising:
    an input/output interface configured to electronically communicate with the first valve and the second valve; and
    a processing circuit configured to:
        selectively cause the first valve to be in a first valve first position, in which the first valve facilitates fluid communication from the inlet manifold to the outlet manifold through the first branch, and a first valve second position, in which the first valve prohibits fluid communication from the inlet manifold to the outlet manifold through the first branch, and
        selectively cause the second valve to be in a second valve first position, in which the second valve facilitates fluid communication from the inlet manifold to the outlet manifold through the second branch, and a second valve second position, in which the second valve prohibits fluid communication from the inlet manifold to the outlet manifold through the second branch.

2. The controller of claim 1, wherein:
    the input/output interface is further configured to electronically communicate with the sensor; and
    the processing circuit is further configured to:
        receive a signal from the sensor,
        determine, based on the signal, a first pressure within the inlet manifold and a second pressure within the outlet manifold, and
        determine, based on the first pressure and the second pressure, a pressure differential.

3. The controller of claim 2, wherein:
    the input/output interface is further configured to electronically communicate with the pump; and
    the processing circuit is further configured to selectively operate the pump to cause reductant to be provided to the inlet manifold.

4. The controller of claim 3, wherein the processing circuit is further configured to:
    compare the pressure differential to a target pressure differential;
    cause operation of the pump to be decelerated in response to the pressure differential being greater than the target pressure differential; and
    cause operation of the pump to be accelerated in response to the pressure differential being lower than the target pressure differential.

5. The controller of claim 4, wherein the processing circuit is further configured to cause operation of the pump to be maintained in response to the pressure differential being equal to the target pressure differential or within a threshold of the pressure differential.

6. The controller of claim 4, wherein the processing circuit is further configured to cause the first valve to move towards the first valve second position in response to the pressure differential being greater than the target pressure differential.

7. The controller of claim 6, wherein the processing circuit is further configured to cause the first valve to move away from the first valve second position in response to the pressure differential being less than the target pressure differential.

8. The controller of claim 7, wherein the processing circuit is further configured to cause the second valve to move towards the second valve second position in response to the pressure differential being greater than the target pressure differential.

9. The controller of claim 8, wherein the processing circuit is further configured to cause the second valve to move away from the second valve second position in response to the pressure differential being less than the target pressure differential.

10. The controller of claim 1, wherein:
    the processing circuit comprises a memory that stores a first maximum flow rate possible through the first flow restrictor and a second maximum flow rate possible through the second flow restrictor; and
    the processing circuit is further configured to:
        receive a dosing command and determine a target flow rate based on the dosing command,
        reposition the first valve based on the target flow rate, the first maximum flow rate, and the second maximum flow rate, and
        reposition the second valve based on the target flow rate, the first maximum flow rate, and the second maximum flow rate.

11. A process for executing a dosing command by a reductant delivery system that comprises a dosing module comprises a pump, an inlet manifold coupled to the pump, a nozzle, an outlet manifold coupled to the nozzle, a first branch coupled to the inlet manifold and the outlet manifold and having a first flow restrictor and a first valve, a second branch coupled to the inlet manifold and the outlet manifold and having a second flow restrictor and a second valve, a sensor coupled to the inlet manifold and the outlet manifold, and a controller configured to electronically communicate with the pump, the first valve, the second valve, and the sensor, the process comprising:
    receiving, by the controller, the dosing command;
    determining, by the controller, a target flow rate based on the dosing command;
    establishing, by the controller, a first valve first position of the first valve based on the target flow rate, the first valve first position being between a first valve maximum position and a first valve minimum position, the first valve maximum position associated with a first valve maximum flow rate through the first valve and the first valve minimum position associated with prevention of flow through the first valve; and establishing, by the controller, a second valve first position of the second valve based on the target flow rate, the second valve first position being between a second valve maximum position and a second valve minimum position, the second valve maximum position associated with a second valve maximum flow rate through the second valve and the second valve minimum position associated with prevention of flow through the second valve.

12. The process of claim 11, further comprising establishing, by the controller, a speed of the pump based on the target flow rate.

13. The process of claim 11, wherein the first valve first position is established additionally based on the second valve first position and the second valve maximum flow rate.

14. The process of claim 13, further comprising establishing, by the controller, a speed of the pump based on the target flow rate;
wherein the first valve first position is established additionally based on the speed.

15. The process of claim 11, further comprising:
receiving, by the controller, a signal from the sensor;
determining, by the controller, a pressure differential between the inlet manifold and the outlet manifold based on the signal;
comparing, by the controller, the pressure differential to a target pressure differential; and
repositioning, by the controller, at least one of the first valve or the second valve, in response to the pressure differential being less than a first product of the target pressure differential and a threshold or greater than a second product of the target pressure differential and the threshold.

16. The process of claim 15, wherein
repositioning the first valve in response to the pressure differential being less than the first product comprises establishing, by the controller, a first valve second position, the first valve second position closer to the first valve maximum position than the first valve first position is to the first valve maximum position;
repositioning the first valve in response to the pressure differential being greater than the second product comprises establishing, by the controller, a first valve third position, the first valve third position closer to the first valve minimum position than the first valve first position is to the first valve minimum position;
repositioning the second valve in response to the pressure differential being less than the first product comprises establishing, by the controller, a second valve second position, the second valve second position closer to the second valve maximum position than the second valve first position is to the second valve maximum position; and repositioning the second valve in response to the pressure differential being greater than the second product comprises establishing, by the controller, a second valve third position, the second valve third position closer to the second valve minimum position than the second valve first position is to the second valve minimum position.

17. A controller for a dosing module comprises a pump, an inlet manifold coupled to the pump, an outlet manifold, a first branch coupled to the inlet manifold and the outlet manifold and having a first flow restrictor and a first valve, a second branch coupled to the inlet manifold and the outlet manifold, and a sensor coupled to the inlet manifold and the outlet manifold, the controller comprising:
an input/output interface configured to electronically communicate with the first valve and the pump; and
a processing circuit configured to:
selectively cause the first valve to be in a first valve first position, in which the first valve facilitates fluid communication from the inlet manifold to the outlet manifold through the first branch, and a first valve second position, in which the first valve prohibits fluid communication from the inlet manifold to the outlet manifold through the first branch, and
selectively operate the pump to cause reductant to be provided to the inlet manifold.

18. The controller of claim 17, wherein:
the input/output interface is further configured to electronically communicate with the sensor; and
the processing circuit is further configured to:
receive a signal from the sensor,
determine, based on the signal, a first pressure within the inlet manifold and a second pressure within the outlet manifold, and
determine, based on the first pressure and the second pressure, a pressure differential.

19. The controller of claim 18, wherein the processing circuit is further configured to:
compare the pressure differential to a target pressure differential;
cause operation of the pump to be decelerated in response to the pressure differential being greater than the target pressure differential; and
cause operation of the pump to be accelerated in response to the pressure differential being lower than the target pressure differential.

20. The controller of claim 19, wherein the processing circuit is further configured to cause operation of the pump to be maintained in response to the pressure differential being equal to the target pressure differential or within a threshold of the pressure differential.

* * * * *